(12) United States Patent
Schwertfeger

(10) Patent No.: US 7,396,061 B2
(45) Date of Patent: Jul. 8, 2008

(54) METHOD OF USING A DOUBLE-SIDED FOAM-CENTERED ADHESIVE TAPE FOR FASTENING STRUCTURED FLAT CABLES TO SUBSTRATES

(75) Inventor: Michael Schwertfeger, Hamburg (DE)

(73) Assignee: tesa AG, Hamburg (DE)

( * ) Notice: Subject to any disclaimer, the term of this patent is extended or adjusted under 35 U.S.C. 154(b) by 50 days.

(21) Appl. No.: 11/108,565

(22) Filed: Apr. 18, 2005

(65) Prior Publication Data
US 2005/0236871 A1 Oct. 27, 2005

(30) Foreign Application Priority Data
Apr. 21, 2004 (DE) .................. 10 2004 019 908

(51) Int. Cl.
*B60J 9/00* (2006.01)
(52) U.S. Cl. .................................... 296/1.01
(58) Field of Classification Search ............... 296/1.01, 296/214; 428/40.1; 156/53, 349, 367
See application file for complete search history.

(56) References Cited

U.S. PATENT DOCUMENTS

| | | | | |
|---|---|---|---|---|
| 5,516,581 | A * | 5/1996 | Kreckel et al. ............ | 428/317.3 |
| 5,948,201 | A * | 9/1999 | Alveskog .................... | 156/249 |
| 6,217,696 | B1 * | 4/2001 | Hartmann et al. ........... | 156/247 |
| 6,475,324 | B1 * | 11/2002 | Hartmann et al. ........... | 156/247 |
| 6,689,244 | B2 * | 2/2004 | Schwertfeger .............. | 156/247 |
| 6,991,838 | B2 * | 1/2006 | Schwertfeger et al. ..... | 428/40.1 |
| 2005/0000632 | A1 * | 1/2005 | Von Samon-Himmelstjerna ............ | 156/230 |
| 2007/0107831 | A1 * | 5/2007 | Von Samson-Himmelstjerna et al. ......................... | 156/191 |

FOREIGN PATENT DOCUMENTS

| | | |
|---|---|---|
| DE | 199 10 730 A1 | 10/1999 |
| WO | WO 01/56777 A1 | 8/2001 |
| WO | WO 2005/039006 A1 | 4/2005 |

OTHER PUBLICATIONS

European Search Report.

* cited by examiner

*Primary Examiner*—H Gutman
(74) *Attorney, Agent, or Firm*—Norris McLaughlin & Marcus PA

(57) ABSTRACT

Use of a double-sided adhesive tape with a carrier layer made of PE foam, the PE foam having a compressive strength of less than 300 kPa under a compressive strain of 50% (measured in accordance with ISO 844), for fastening structured and/or profiled flat cables preferably in the interior of passenger cars.

5 Claims, 1 Drawing Sheet

METHOD OF USING A DOUBLE-SIDED FOAM-CENTERED ADHESIVE TAPE FOR FASTENING STRUCTURED FLAT CABLES TO SUBSTRATES

The invention relates to the use of a double-sided foam-centered adhesive tape for fastening structured flat cables particularly to substrates such as the interior decorative components of a passenger car, especially roof lining, door side part and boot lid in the car's interior.

In the interiors of passenger cars, circular-section cables are increasingly being replaced, owing to the burgeoning electronics and the associated increase in space requirement, by what are called "flat cables." These flat cables are predominantly either copper strips laminated together with film (FFC) or conductor tracks in the form of thin, flexible printed circuits (FPC).

In order to ensure reliable, permanent fastening of a relatively smooth, flat cable of this kind in the roof lining of a passenger car, even under adverse conditions, in other words, for example, over the lifetime of a car under the effect of temperature and atmospheric humidity, resin-blended acrylate adhesives of high shear strength have already become established.

Besides the said FFC and FPC flat cables, which possess a relatively smooth and therefore easy-to-bond surface, the intention now is to make use as well of more highly structured cables, such as extruded flat cables, for example, also called grid-ridge cables. On account of their profiling, these cables have a surface which is very difficult to bond. The same applies to laminated flat cables (FFC) with relatively large cross-sections for transmitting relatively high levels of power. These cables too are much more profiled than those used to date.

An important factor affecting the durability of the adhesive bond is the manner in which it is implemented. To date it has still not been possible to bond and mount such flexible parts as flat cables in roof linings in a fully automated procedure. Very often, the double-sided adhesive tape is first bonded manually in sections to the flat cables, in a first assembly operation. In a further, second assembly operation, then, the liner is removed and the flat cable is bonded manually, for example, in the roof lining of a passenger car. As a result of this procedure, careful application of the double-sided adhesive tape has been sufficiently assured to date.

In the case of manual assembly it is always important for the adhesive properties of the adhesive tape to make the assembly operation easier as far as possible. Self-adhesive masses are therefore always pressure-sensitive, since the pressure-sensitivity is the most important principle of action for the adhesive bond. This, however, is often very difficult to realize.

The adhesive, for easy assembly, is often required to have a high initial tack and high instantaneous bond strength. On the other hand, for long-term durability in the life of a vehicle, an adhesive of very high shear strength is needed in order to fasten the flat cable securely. From an adhesives standpoint these are contradictory requirements, which can only ever be realized through a compromise.

As a result, the principle of action of applied pressure is always assigned particular importance.

In order to allow this complicated assembly operation to be at least partly automated, initial attempts have been made to implement the application of the double-sided adhesive tape by means of corresponding applicators such as adhesive-tape dispensers, which are guided by a robot, to the roof lining of a passenger car, for example. In the case of bonding by the applicator, the liner is to be removed at the same time. The subsequent manual assembly operation then consists only of the placement of the flat cables onto the adhesive tape.

As a result of this partial automation, the manual bonding operation is even less favorable.

Processing personnel now no longer have the possibility of bonding short sections of adhesive tape to the correspondingly aligned and fastened flat cables in a careful manner in an ergonomically designed workplace. The complete flat cables must now be aligned and pressed onto the roof lining equipped with double-sided adhesive tape. With this extensive work mode, owing to the increased difficulty of access, the flat cable can no longer be pressed against the double-sided adhesive tape so carefully, in every region, as was previously the case with the bonding of double-sided adhesive tape sections. A further complicating factor is that this operation now normally takes place in an area with substantially shorter cycle times.

Against the background of the upcoming, highly profiled flat cables already mentioned above, this kind of partially automated procedure, or adhesive bonding, can no longer be realized with double-sided adhesive tapes that have been available on the market to date.

Against the background of the attempts, already mentioned above, to automate partially the bonding of flat cables with a corresponding applicator, the liner is accorded a particular importance. In the fastening of flat cables in passenger car roof linings, for example, the double-sided adhesive tape is first applied to the roof lining with the applicator. The task here is to be able to follow the course of the cable as precisely as possible. The right-angled branches that are needed in the case of flat cables can normally be bonded on subsequently only by removal and re-placement. This means correspondingly long cycle times per bond, which are particularly critical even in the case of partial automation. These cycle times can be reduced considerably if the double-sided adhesive tape can be bonded in very narrow radii and if the applicator must not be removed and re-placed for every branch.

It is an object of the invention to provide an adhesive tape which permits reliable fastening of structured and/or profiled flat cables particularly on substrates such as the interior decorative components of a passenger car, especially roof lining, door side part and boot lid, and which is easy to apply and does not have the disadvantages known from the prior art.

This object is achieved through the use of a double-sided foam-centered adhesive tape as described hereinbelow.

BRIEF DESCRIPTION OF THE DRAWINGS

The invention will now be described in greater detail with reference to the drawings, wherein.

Figure 1:
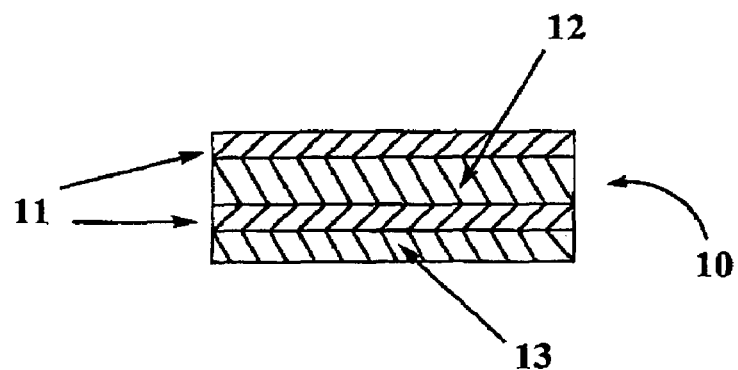
FIG. 1 is a schematic of one embodiment of an adhesive tape 10 according to the present invention, depicting foam carrier 12 sandwiched between two adhesive layers 11, one of which adhesive layers is lined with liner 13.
Figure 2:
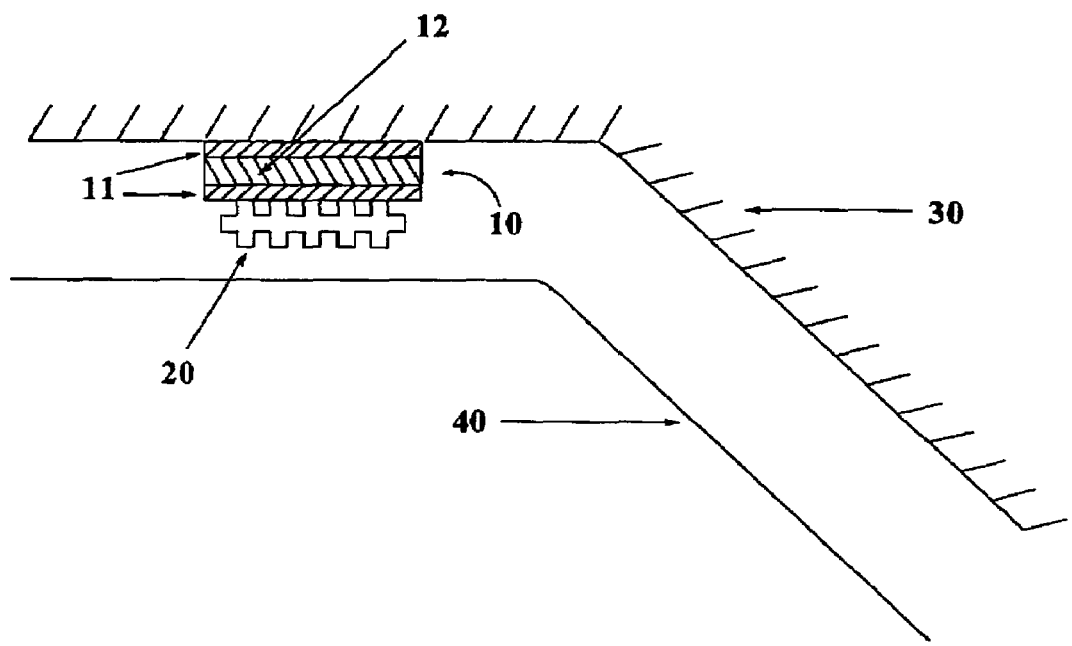
FIG. 2 is a schematic showing the adhesive tape 10 of FIG. 1, after liner 13 has been removed, adhered to profiled flat cable 20 and fixed between car frame 30 and roof interior 40 of a passenger car.

The invention accordingly provides for the use of a double-sided adhesive tape with a carrier layer of PE foam, the PE foam having a compressive strength of less than 300 kPa under a compressive strain of 50% (measured in accordance with ISO 844), for fastening structured and/or profiled flat cables preferably in the interior of passenger cars.

Compressive strength denotes a force required to compress a foam by a certain height (50% of the normal height). It is critically influenced by the molecular structure of the cell walls.

In one first advantageous embodiment of the invention there is a liner composed preferably of an LDPE film on one side of the adhesive tape.

LDPE liners are known to be particularly conformable and flexible, and so find comprehensive use.

With further preference the adhesives are composed of resin-blended acrylate masses which ought to have a high shear strength. These masses are mentioned for example in D. Satas [Handbook of Pressure Sensitive Adhesive Technology, 1989, Verlag VAN NOSTRAND REINHOLD, New York].

One advantageous development uses a pressure-sensitive adhesive
which is obtainable by free-radical addition polymerization,
which is based to an extent of at least 65% by weight on at least one acrylic monomer from the group of the compounds of the following general formula:

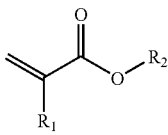

where $R_1$=H or $CH_3$ and the radical $R_2$=H or $CH_3$ or is selected from the group consisting of branched and unbranched saturated alkyl groups having 2 to 20, preferably 4 to 9, carbon atoms,
for which the average molecular weight of the pressure-sensitive adhesive is at least 650 000,
and which, when applied to a carrier, possesses a preferential direction, the refractive index measured in the preferential direction, $n_{MD}$, being greater than the refractive index measured in a direction perpendicular to the preferential direction, $n_{CD}$, and the difference $\Delta n = n_{MD} - n_{CD}$ being at least $1 \times 10^{-5}$.

Non-exclusive examples of alkyl groups which may be used preferentially for the radical $R_2$ include butyl, pentyl, hexyl, heptyl, octyl, isooctyl, 2-methylheptyl, 2-ethylhexyl, nonyl, decyl, dodecyl, lauryl or stearyl (meth)acrylate or (meth)acrylic acid.

The punching process also proceeds outstandingly when a pressure-sensitive adhesive is used which is based to an extent of 35% by weight on comonomers in the form of vinyl compounds, particularly on one or more vinyl compounds selected from the following group: vinyl esters, vinyl halides, vinylidene halides, and nitriles of ethylenically unsaturated hydrocarbons. Also covered by the use are acrylic compounds having functional groups coming under the designation "vinyl compound". Vinyl compounds of this kind, containing functional groups, are maleic anhydride, styrene, styrene compounds, vinyl acetate, (meth)acrylamides, N-substituted (meth)acrylamides, β-acryloyloxypropionic acid, vinyl acetic acid, fumaric acid, crotonic acid, aconitic acid, dimethylacrylic acid, trichloroacrylic acid, itaconic acid, vinyl acetate, hydroxyalkyl (meth)acrylate, amino-containing (meth)acrylates, hydroxyl-containing (meth)acrylates, more preferably 2-hydroxyethyl (meth)acrylate, 2-hydroxypropyl (meth)acrylate and/or 4-hydroxybutyl (meth)acrylate, and photoinitiators functionalized with double bond; the above list is only exemplary and not exhaustive.

For the pressure-sensitive adhesives it is especially advantageous if the composition of the corresponding monomers is chosen such that the resulting adhesives possess pressure-sensitive adhesion properties in accordance with D. Satas [Handbook of Pressure Sensitive Adhesive Technology, 1989, Verlag VAN NOSTRAND REINHOLD, New York]. For this purpose the glass transition temperature of the acrylate pressure-sensitive adhesive should be situated, for example, below 25° C.

The pressure-sensitive adhesives employed for this use, particularly the polyacrylate pressure-sensitive adhesives praised above for their advantage, are prepared preferably by a free-radically initiated addition polymerization. One process very suitable for this purpose is distinguished by the following steps:
polymerization of a mixture comprising at least one vinyl-, acryloyl- or methacryloyl-based monomer or a combination of these monomers, the average molecular weight of the resultant polymers being situated above 650 000,
subsequent extrusion coating of the polymer composition,
subsequent crosslinking of the polymer composition on the carrier by irradiation with electron beams.

This extrusion coating takes place preferably through an extrusion die. The extrusion dies used may come from one of the three following categories: T-dies, fishtail dies, and coathanger dies. The individual types differ in the design of their flow channel. For the preparation of oriented acrylate pressure-sensitive adhesives it is particularly preferred to carry out coating onto a carrier using a coathanger die, specifically in such a way that a layer of polymer on the carrier is formed by a movement of die relative to carrier. The period between coating and crosslinking is advantageously very short, preferably not more than 10 s. By virtue of the shaping of the acrylate hotmelt in the coathanger die and its emergence from the die with a defined film thickness, as a result of the stretching of the film of pressure-sensitive adhesive as it transfers to the carrier material, to give a thinner film thickness, and as a result of the subsequent inline crosslinking, the orientation is obtained.

The free-radical addition polymerization can be conducted in the presence of an organic solvent or in the presence of water, or in mixtures of organic solvents and water, or in bulk. It is preferred to use as little solvent as possible. Depending on conversion and temperature, the polymerization time amounts to between six and 48 h. In the case of solution polymerization the solvents used are preferably esters of saturated carboxylic acids (such as ethyl acetate), aliphatic hydrocarbons (such as n-hexane or n-heptane), ketones (such as acetone or methyl ethyl ketone), special-boiling-point spirit, or mixtures of these solvents. For polymerization in aqueous media or in mixtures of organic and aqueous solvents, the emulsifiers and stabilizers known to the skilled person for this purpose are added to the polymerization. Polymerization initiators used are customary radical-forming compounds such as peroxides, azo compounds and peroxosulphates, for example. Initiator mixtures as well can be used. During the polymerization it is possible to use further regulators to lower the molecular weight and to reduce the polydispersity. As polymerization regulators it is possible, for example, to use alcohols and ethers. The molecular weight of the acrylate pressure-sensitive adhesives lies advantageously between 650 000 and 2 000 000 g/mol, more preferably between 700 000 and 1 000 000 g/mol.

In a further procedure the polymerization is carried out in polymerization reactors which are generally provided with a stirrer, two or more feed vessels, reflux condenser, heating and cooling and are equipped for operation under an $N_2$ atmosphere and superatmospheric pressure.

Following the polymerization in solvent, the polymerization medium can be removed under reduced pressure, this operation being carried out at elevated temperatures, in the range from 80 to 150° C., for example. The polymers can then be used in the solvent-free state, in particular as hotmelt pressure-sensitive adhesives [hotmelt PSAs]. In some cases it is also of advantage to prepare the polymers of the invention in bulk (without solvent).

To prepare the acrylate PSAs the polymers can be given a conventional modification. For example, tackifying resins, such as terpene, terpenephenolic, $C_5$, $C_9$, $C_5/C_9$ hydrocarbon, pinene and indene resins or rosins, alone or in combination with one another, can be added. It is also possible, furthermore, to use plasticizers, various fillers (for example fibers, carbon black, zinc oxide, titanium dioxide, solid microbeads, solid or hollow glass beads, silica, silicates, chalk, blocking-free isocyanates, etc.), ageing inhibitors, light stabilizers, ozone protectants, fatty acids, plasticizers, nucleators, expandants and/or accelerants as additives. Crosslinkers and crosslinking promoters as well can be mixed in. Examples of suitable crosslinkers for electron beam crosslinking are difunctional or polyfunctional acrylates, difunctional or polyfunctional isocyanates or difunctional or polyfunctional epoxides.

The acrylate hotmelts, as they are or in the form of blends, are coated onto the carrier material through a die with a variable slot width and then are cured on the carrier using electron beams. In inline operation, crosslinking takes place immediately after the pressure-sensitive adhesive has been applied to the carrier.

As the carrier layer it is particularly preferred to use PE foams which have a compressive strength, under a compressive strain of 50% (measured in accordance with ISO 844), of less than 150 kPa.

With further preference the PE foams used may be characterized as follows:

| | | |
|---|---|---|
| Density [kg/m³] | 50 to 90 | preferably 67 |
| Tensile strength, MD [kPa] - ISO 1926 | 800 to 1000 | preferably 895 |
| Breaking elongation, MD [%] - ISO 1926 | 150 to 200 | preferably 180 |
| Compressive strength [kPa] - ISO 844 | | |
| Compressive strain 10% | 25 to 45 | preferably 36 |
| Compressive strain 25% | 50 to 70 | preferably 60 |
| Compressive strain 50% | 120 to 160 | preferably 140 |

Surprisingly and advantageously it is possible to dispense the adhesive tape of the invention using the known applicators, which can also be moved by means of robots.

As a result of the low compressive strength, the PE foam is particularly conformable and, in conjunction with the elastic LDPE liner, can be bonded in very narrow radii by the known applicators. This means that subsequent bonding can take place in accordance with the course of the cable, to a passenger car roof lining, for example, using the applicator, without the loss of time as a result of the removal and re-placement that are necessary otherwise.

As a result of the low compressive strength of the PE foam and the associated very low rebound forces of the foam, it is possible to achieve spontaneously sufficient contact with the surface to be bonded of the innovative structured and/or profiled flat cables even with a resin-blended acrylate adhesive of high shear strength, and even when the applied pressure is low and very brief. As a result of the low rebound forces of the foam, moreover, the viscoelastic flow behavior of the acrylate adhesive is allowed to take full effect, without detachment phenomena occurring beforehand. This is particularly advantageous because, on account of their properties, the said acrylate adhesives have for many years been established in the automotive industry specifically for the long-term fastening of parts in the interior of passenger cars.

The product design according to the invention still allows processing personnel to achieve reliable, spontaneous fastening of the new, structured flat cables, even under the increasingly stringent working conditions mentioned above, without special trouble being taken, and with a very high applied pressure on the vehicle roof lining.

The invention claimed is:

1. A method of fastening a structured flat cable, a profiled flat cable or a structured profiled flat cable to a substrate, said method comprising fastening said cable to said substrate with a double-sided adhesive tape, said double-sided adhesive tape comprising a carrier layer made of polyethylene (PE) foam, the PE foam having a compressive strength of less than 300 kPa under a compressive strain of 50%.

2. Method according to claim 1, wherein a liner composed of a low density polyethylene (LDPE) film is on one side of the adhesive tape.

3. Method according to claim 1, wherein the adhesive tape comprises an adhesive, and the adhesive is a resin-blended acrylate adhesive possessing high shear strength.

4. Method according to claim 1, wherein the compressive strength under a compressive strain of 50% is less than 150 kPa.

5. Method according to claim 1, wherein the cable is in the interior of a passenger car.

* * * * *